No. 877,138. PATENTED JAN. 21, 1908.
W. G. STONE.
ANIMAL TRAP.
APPLICATION FILED APR. 7, 1906.
2 SHEETS—SHEET 2.
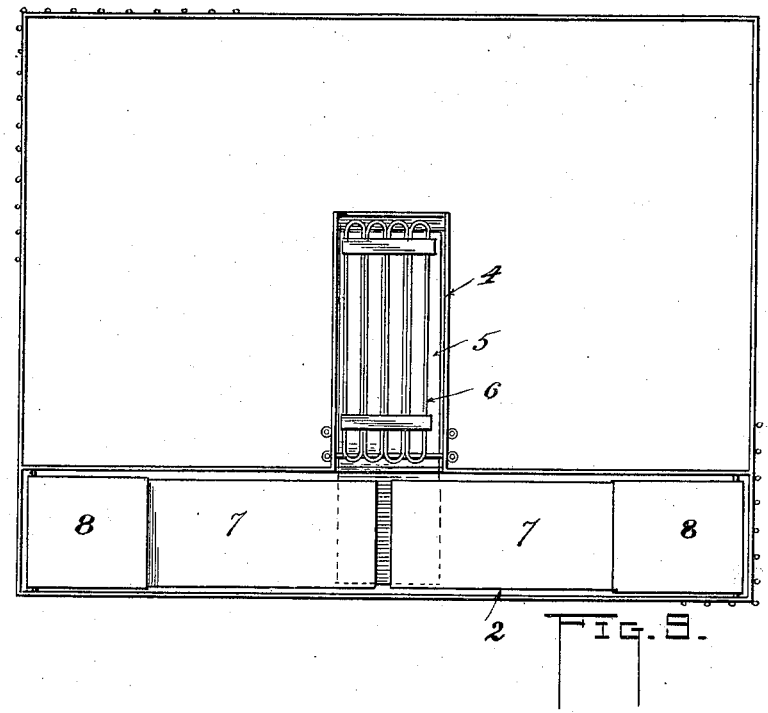
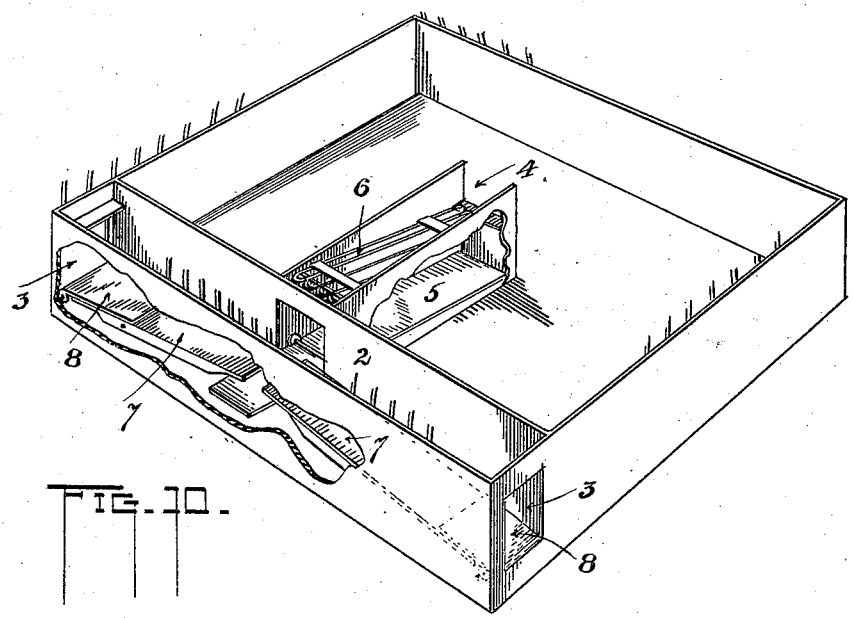
WITNESSES
INVENTOR
William G. Stone,
By L. M. Thurlow,
Atty.

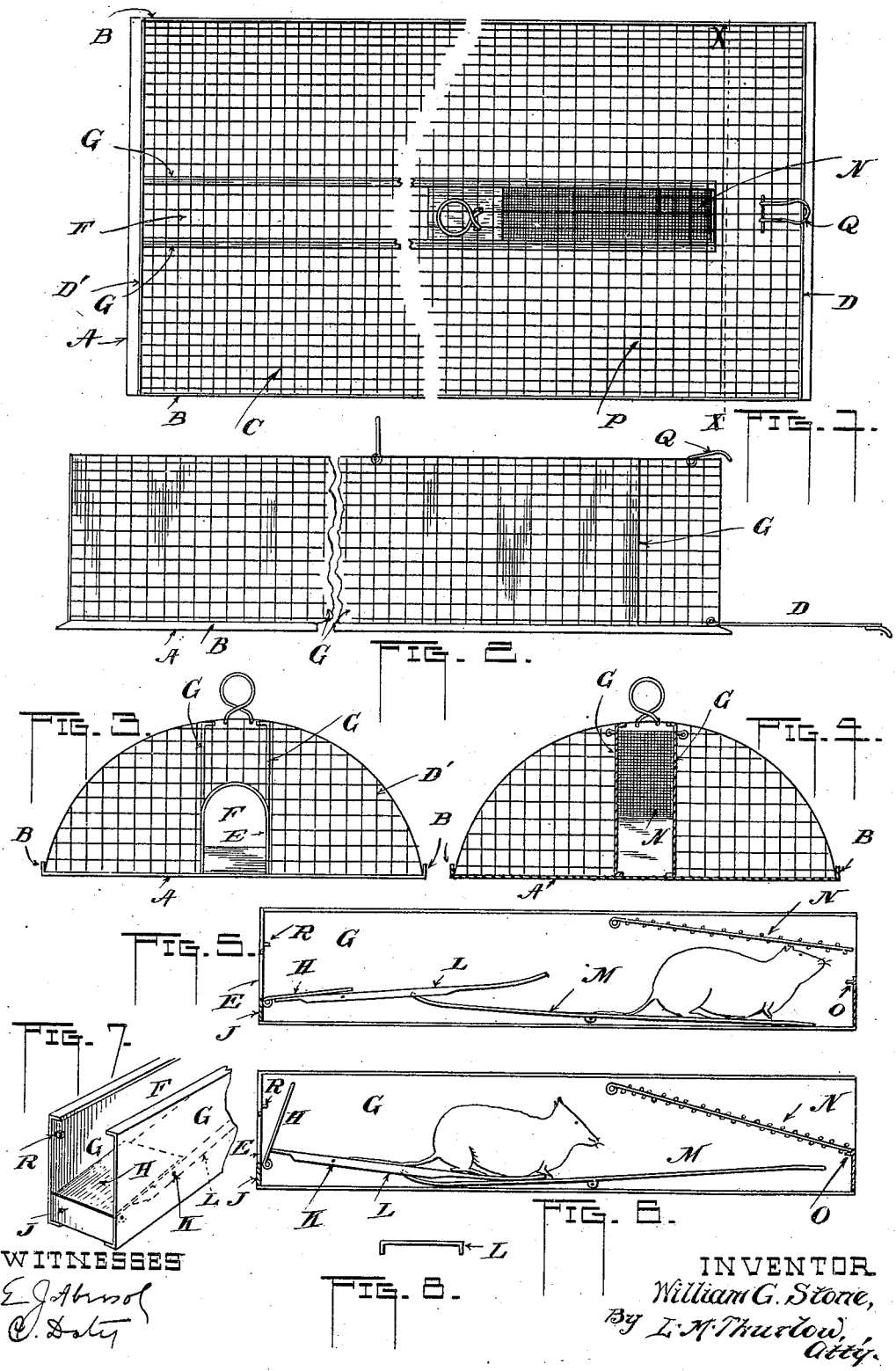

UNITED STATES PATENT OFFICE.

WILLIAM G. STONE, OF KNOXVILLE, ILLINOIS.

ANIMAL-TRAP.

No. 877,138.     Specification of Letters Patent.     Patented Jan. 21, 1908.

Application filed April 7, 1906. Serial No. 310,560.

*To all whom it may concern:*

Be it known that I, WILLIAM G. STONE, a citizen of the United States, residing at Knoxville, in the county of Knox and State of Illinois, have invented certain new and useful Improvements in Animal-Traps; and he does hereby declare that the following is a full, clear, and exact description of the invention, which will enable others skilled in the art to which it appertains to make and use the same.

This invention pertains to improvement in animal traps and has for one of its objects to provide a trap that will always be set so that no attention need be paid thereto other than to supply it with the necessary bait.

A further object is to provide a trap that will be immediately closed to the exit of an animal just entered, but will be again opened as the animal progresses farther within.

Another object of the invention is to simplify animal traps by providing few parts which need no delicate adjustment in order to place them in condition for use.

In the appended drawings, Figure 1 is a top view of my trap. Fig. 2 is a side elevation of the same showing an open door. Fig. 3 is an end view of the trap showing the entrance thereto. Fig. 4 is an end view in cross section on line XX, Fig. 1, being the opposite end from that shown in Fig. 3. Fig. 5 is a longitudinal section of the runway of the trap showing the open position for entrance of the animal. Fig. 6 is a similar view showing the closed position of certain parts. Fig. 7 is a perspective view of a part of the runway. Fig. 8 is an end view showing the form of a lever shown in Figs. 5 and 6. Fig. 9 is a horizontal section of a modified form of trap, and Fig. 10 is a perspective view of the same.

In the figures, A is the bottom of the trap which may be of metal or wood, and has upturned edges B at the sides for convenience in soldering or otherwise attaching a gauze inclosing material C thereto to form a cage. Each end of the inclosure thus formed is provided with a gauze covering, one of which is hinged to drop down as at D in Fig. 2. The fixed end D' is provided with an opening or entrance shown at E which communicates with a central passage or runway F created by the erection of two vertical parallel walls G centrally located within the cage.

In constructing my trap I have employed the members G described which are securely spaced apart to form the required passage way. At one end, the entrance end of the trap, the said members G abut, while the opposite ends terminate some distance from the door D hereinbefore described.

At the entrance E of the runway F is pivoted a door H the pivot of which is raised somewhat above the floor A, the space being closed by a vertical portion J. Pivoted within the runway at K is a lever L one end of which extends to the pivot of the said door H, the other end extending along the passage in the opposite direction. Still further along the said passage is pivoted a second lever M, one of its ends extending beneath the lever L as shown and the other end lying close to the exit end of the passage. The relation of the levers to one another and the relation of the lever L to the door H is such that when the animal enters the opening E it rests upon the said door H which is supported on the pivot K as shown in Fig. 5 but as it enters still further it passes beyond the fulcrum or pivot of the lever L the latter sinking under the weight of the animal. As this occurs the end of the lever beneath the door H is caused to rise thereby lifting said door up with it to close the opening E. The animal being startled by the noise and feeling the lever sink under it, jumps forward upon the outer end of the lever M as shown in Fig. 5 carrying that end down and raising the other end which is beneath the lever L. The latter being raised thereby allows the door H to open ready for the entrance of another animal. In the exit end of the runway is placed a light grating or screen N, one end being pivoted at the top of the passage and the other end resting upon a ledge or stop O. The animal finding no apparent exit naturally pushes beneath this grating N and finding that it will raise passes thereunder and out into the inclosure P surrounding the passage where it remains until liberated through the door D. The bait is placed within the inclosure P, and the animal in attempting to reach it naturally enters the opening E from which it cannot escape after having passed upon the lever L. A suitable catch is provided at Q for engaging a projection of the door D whereby the latter is kept shut.

A stop R is placed near the entrance E which prevents the door H raising too high so that gravity will not cause it to fall when necessary. The passage F is preferably made narrow so that the animal cannot turn round in it although should it do so it would be impossible to get out.

In Figs. 9 and 10 is shown a slightly modified form of the trap. It merely consists in providing the runway 2, which corresponds to F of the other figures, with two entrances as at 3 3, there being a passage 4 communicating with the middle of the passage 2 which contains a lever 5 and member 6 corresponding with M and N, of the other figures, respectively as will be seen. The lever L of the figures preceding 9 and 10 is seen duplicated in said Figs. 9 and 10 at 7, 7 and either of these when depressed closes its door 8 and then rests upon the lever 5 being again raised and the door opened when the animal enters passage 4. There is no actual difference between these two forms of trap other than the duplicating of the said lever L.

My trap is adapted for animals of all kinds whether belonging to the rodent family or larger animals. The trap as I construct it is very simple and of few parts and by its peculiar construction and arrangement of levers is always set as hereinbefore stated.

I am aware that the idea of using a door opened by gravity and levers actuated by the animal for closing said door against the force of gravity is not new, but I provide a peculiar arrangement of the lever in that the fulcrum of the lever which closes the door is so placed that it lies substantially beneath the free end of the door when the latter is open. As may be understood from the drawing, the animal reaches the lever L almost immediately at the fulcrum thereof, its weight being gradually placed thereon, as it cautiously moves forward; the said lever descending slowly until at its lowest position; the door having then raised, the animal is imprisoned before it is aware of it. I place the end of the second lever M beneath the lever L so as to push it upward and do not connect the two levers in any way there being no useless friction to prevent free and easy movement of the members.

In operation the lever L in lowering under the weight of the animal, has the long heavy end of the lever M to raise and this aids in causing the said lever L to lower slowly so that the animal is not frightened in stepping thereupon.

I am not aware that the exact construction and combination of parts herein shown and described has heretofore been known and therefore I claim:

1. A trap comprising a cage, an inclosed passage-way having an exit into the cage, and provided with an entrance, a gravity opened door hinged at said entrance for closing it, a lever having one end positioned beneath the door close to the hinge thereof, its fulcrum being substantially at the free end of the door when the latter is open for the purposes described, a second lever fulcrumed beyond the first and having one end adapted to bear upward beneath and against said first lever, and a normally gravity closed door for closing the exit of the passage and arranged to be raised by the animal.

2. A trap comprising a cage, an inclosed passage-way having an entrance opening in one end, and having a place of exit at its other end opening into the cage, a gravity opened door for closing the entrance opening, a lever having one free end and one end extending beneath the door for raising and closing it when the weight of the animal is imposed upon the opposite free end of said lever, a second lever having one free end and one end extending beneath the said free end of the said first lever and adapted to contact with and raise the same by the weight of the animal upon the opposite free end of said second lever to permit the door to open, and a gravity operated normally closed door for closing the exit opening of the passage and adapted to be raised by the animal to permit its escape into the cage.

3. A trap comprising a cage, an inclosed passage-way having an entrance opening in one end, and having a place of exit at its other end opening into the cage, a gravity closed door for the exit adapted to be raised by the animal within the passage, a door for closing the entrance the same adapted to open by gravity, a lever pivoted within the passage and having one free end and arranged at one end to contact with the under side of the open door to close the same when the weight of the animal is imposed upon its other free end, and a second lever having one free end and having one end beneath said free end of the first lever and adapted to raise the same by the weight of the animal on the end of the said second lever opposite to that which raises the first thereby to depress the door closing end of said first lever and permit said door to open, said second lever adapted to remain depressed until raised by entrance of another animal as decribed.

In testimony whereof I affix my signature, n presence of two witnesses.

WILLIAM G. STONE.

Witnesses:
 E. J. ABERSOL,
 L. M. THURLOW.